Figure 1:
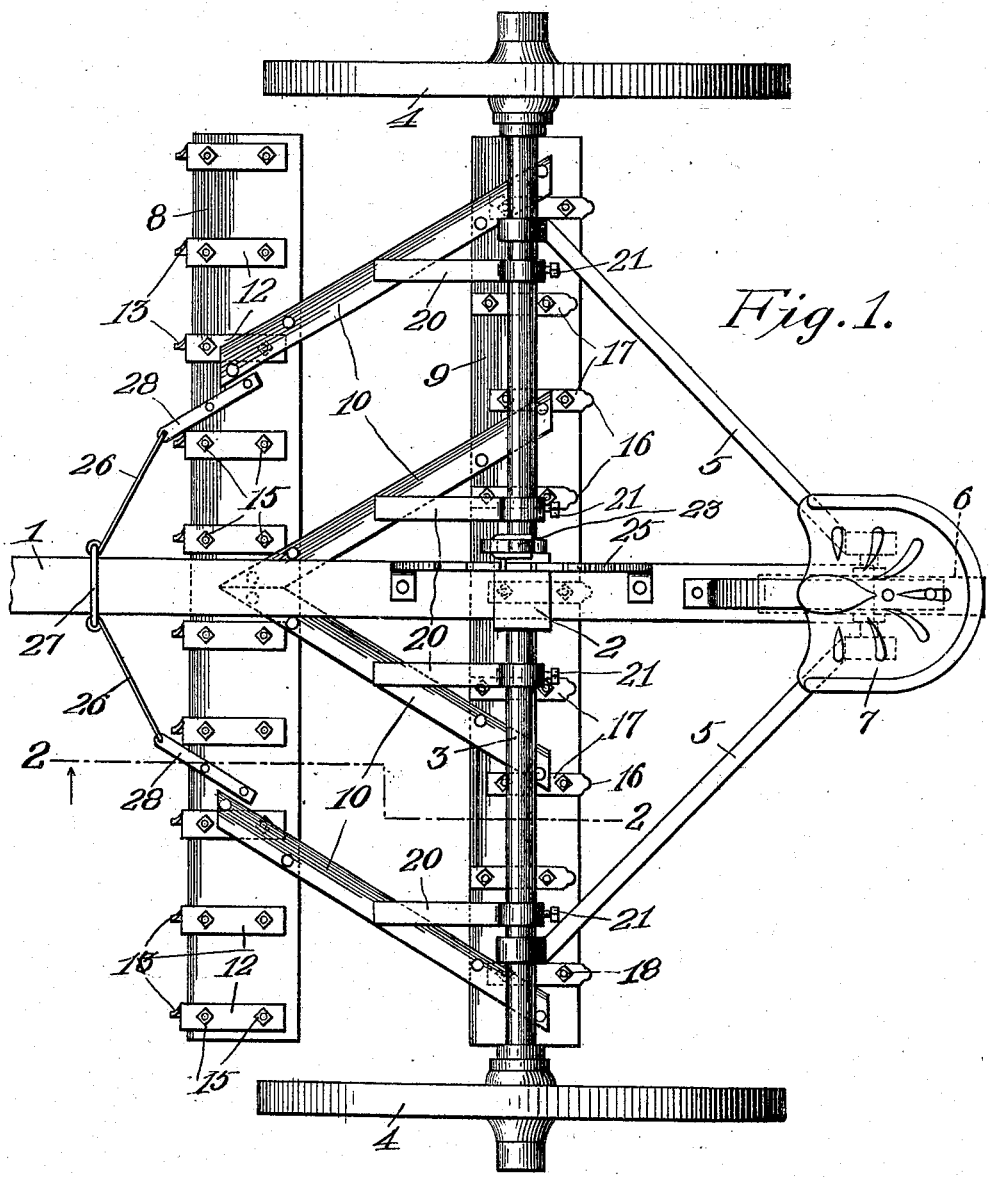

B. POMIJE.
WEED DESTROYER AND GATHERER.
APPLICATION FILED SEPT. 21, 1908.

924,498.

Patented June 8, 1909.
2 SHEETS—SHEET 1.

B. POMIJE.
WEED DESTROYER AND GATHERER.
APPLICATION FILED SEPT. 21, 1908.
924,498.
Patented June 8, 1909.
2 SHEETS—SHEET 2.
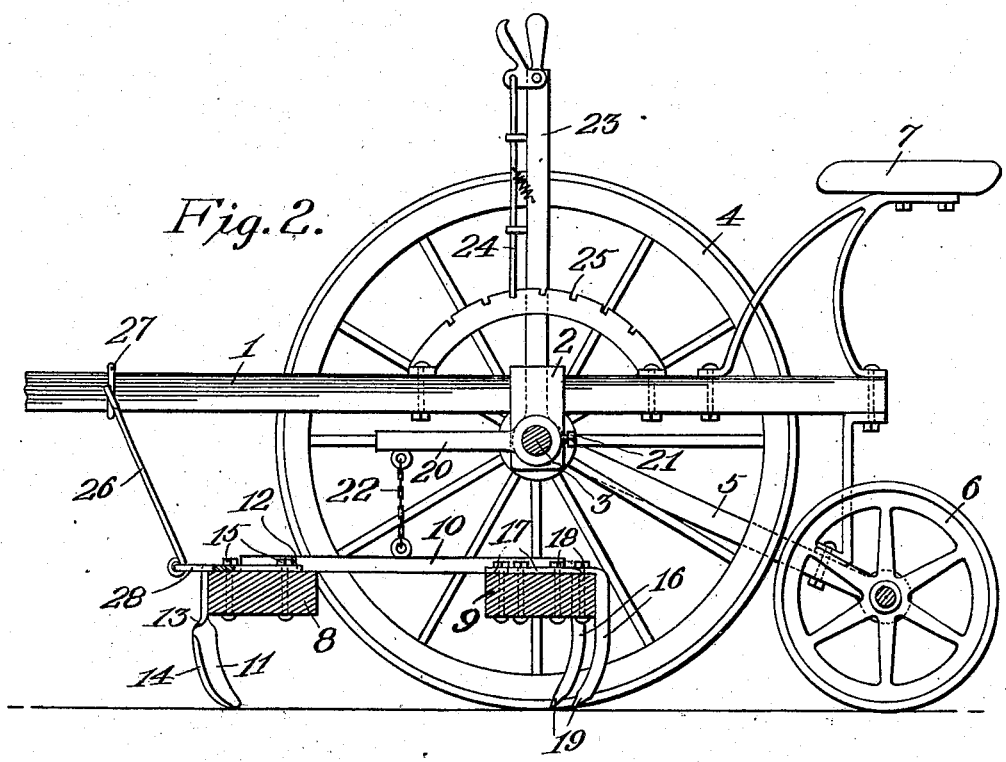
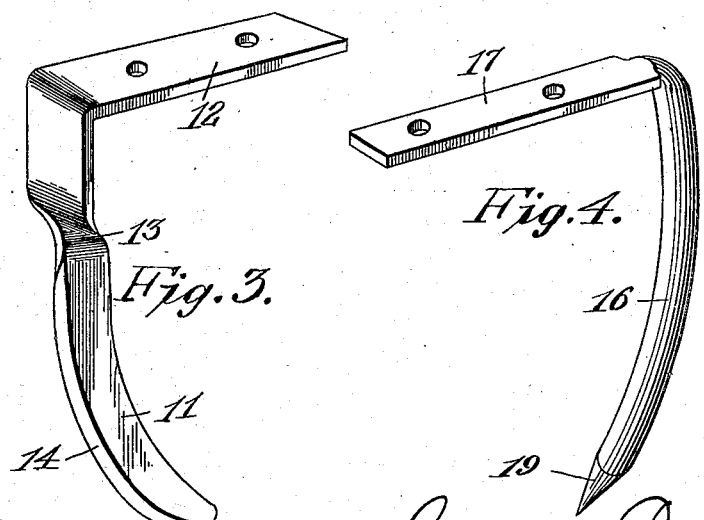
Witnesses
James F. Crown
Nina L. Martin
Inventor
Benjamin Pomije
By Watson E. Coleman
Attorney

UNITED STATES PATENT OFFICE.

BENJAMIN POMIJE, OF NEW PRAGUE, MINNESOTA.

WEED DESTROYER AND GATHERER.

No. 924,498.   Specification of Letters Patent.   Patented June 8, 1909.

Application filed September 21, 1908. Serial No. 453,950.

*To all whom it may concern:*

Be it known that I, BENJAMIN POMIJE, a citizen of the United States, residing at New Prague, in the county of Lesueur and State of Minnesota, have invented certain new and useful Improvements in Weed Destroyers and Gatherers, of which the following is a specification, reference being had to the accompanying drawings.

This invention is an improved weed destroying and gathering machine which consists of the novel features of construction and the combination and arrangement of parts hereinafter fully described and claimed.

The object of the invention is to provide a machine of this character which will be simple and practical in construction, which will effectively cut the stalks and roots of weeds and grass, gather them, and which may be easily and conveniently operated.

The above and other objects of the invention as will hereinafter appear are accomplished in the preferred embodiment in the invention illustrated in the accompanying drawings and which—

Figure 1 is a plan view of the machine; Fig. 2 is a vertical section taken on the line 2—2 in Fig. 1; Fig. 3 is a perspective view of one of the knives; and Fig. 4 is a similar view of one of the gathering or rake teeth.

The improved weed cutting and gathering apparatus is adapted to be suspended from and dragged along by a wheeled truck consisting of a draft tongue 1 carrying intermediate its ends a bearing 2 for an axle 3 which latter is provided at its ends with loose supporting wheels 4. The rear end of the tongue is connected by oblique braces 5 to the outer portion of the axle and it carries a small rear wheel 6. Suitable double trees or draft connections may be provided upon the forward portion of the tongue for the attachment of the draft animals.

7 denotes a driver's seat arranged upon the extended rear portion of the tongue.

The cutting and gathering apparatus comprises a frame composed of front and rear transverse beams 8, 9 united by angularly arranged cross bars 10. The front beam 8 carries a row of cutting knives 11 each of which is formed from a metal strap by bending the same at right angles adjacent to its upper end to provide an attaching portion 12, then twisting the depending portion as shown at 13, curving it longitudinally or in a rearward direction and beveling its forward edge to provide a cutting edge 14 as clearly shown in Fig. 3. The attaching portion 12 rests upon the top of the beam 8 and is apertured to receive fastening bolts 15 which effectively secure the knives to said beam. The rear beam 9 carries two sets or rows of similar gathering teeth 16 each of which has a flat apertured attaching portion 17 arranged upon the top of the beam and secured thereto by bolts 18 and it also has a forwardly curved depending tooth portion terminating in a point 19. The curved depending portions of one set of the teeth pass through apertures in the beam 9 and those of the other set of teeth are engaged with the rear edge of said beam, the teeth of the two sets being thereby arranged in a staggered relation. All of the teeth 16 however, are arranged opposite the centers of the spaces between the cutting knives so that said gathering or rake teeth will travel between the cuts made by the knives and will effectively pick up all broken stems, stalks, roots, etc.

This apparatus is loosely suspended so that it will drag upon the ground and is adapted to be elevated now and then to clean the collected material upon its knives and teeth. This suspending and elevating means comprises a plurality of radial arms 20 which are secured upon the shaft 3 by means of set screws 21 and which have their forward ends connected by suspending chains 22 to the cross or connecting bars 10. Fixed to the axle is a hand lever 23 which is disposed adjacent to the tongue and carries a hand retracted and spring projected pawl 24 which engages a segmental rack 25 fixed to the tongue. If desired, the pawl 24 and rack 25 may be omitted. It will be seen upon reference to Fig. 2 when the locking pawl is retracted and the lever 23 swung rearwardly, that the arms 20 will be swung upwardly and rearwardly and will elevate the weed cutting and gathering apparatus so that the weeds which cling to its knives and teeth may be readily knocked therefrom. The front portion of the drag is steadied by means of two links 26 which are connected to the forward portion of the tongue as shown at 27 and have their lower rear ends loosely engaged with plates 28 secured upon the forward beam 8. If desired, the links 26 may be omitted when the drag is used with a wheeled truck and employed as a draft connection when the drag is used without the wheeled truck.

From the foregoing description taken in connection with the accompanying drawings it is thought that the construction, operation and advantages of the invention will be fully understood without a more extended explanation.

Having thus described the invention what is claimed is:

1. In a machine of the character described, the combination with a wheeled truck, of a weed cutting and gathering apparatus comprising a frame and plurality of knives depending from the forward portion of the frame and a plurality of gathering teeth depending from the rear portion of the frame, and means for suspending the frame from said truck.

2. In a machine of the character described, the combination with a wheeled truck, of a weed cutting and gathering apparatus comprising a frame, a plurality of knives depending from the forward portion of the frame and a plurality of gathering teeth depending from the rear portion of the frame, and suspending and elevating means between the truck and the said frame.

3. In a machine of the character described, the combination with a wheeled truck having a tongue, a bearing, an axle in said bearing and wheels loosely arranged on the axle, of a weed cutting and gathering apparatus comprising a frame, a plurality of depending cutting knives upon the forward portion of the frame and a plurality of depending gathering teeth upon the rear portion of said frame, arms projecting from said shaft, flexible connections between said arms and said frame, an operating lever upon the axle and means for locking said lever in adjusted positions.

4. In a machine of the character described, the combination with a wheeled truck having a tongue, a bearing, an axle in said bearing and wheels loosely arranged on the axle, of a weed cutting and gathering apparatus comprising a frame, a plurality of depending cutting knives upon the forward portion of the frame and a plurality of depending and gathering teeth upon the rear portion of said frame, a link connection between the front portion of the frame and the tongue, radially projecting arms upon the shaft, loose connections between said arms and said frame, an operating lever upon the axle, a segmental rack upon the tongue and a pawl carried by the lever for engagement with said rack.

In testimony whereof I hereunto affix my signature in the presence of two witnesses.

BENJAMIN POMIJE.

Witnesses:
    FRED JAHN,
    CHARLY SHROELBR.